United States Patent
Hiramatsu et al.

(10) Patent No.: US 6,771,984 B1
(45) Date of Patent: Aug. 3, 2004

(54) BASE STATION DEVICE AND RADIO COMMUNICATION METHOD

(75) Inventors: Katsuhiko Hiramatsu, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/509,047

(22) PCT Filed: Jul. 23, 1999

(86) PCT No.: PCT/JP99/03943

§ 371 (c)(1), (2), (4) Date: Mar. 21, 2000

(87) PCT Pub. No.: WO00/08778

PCT Pub. Date: Feb. 17, 2000

(30) Foreign Application Priority Data

Aug. 3, 1998  (JP) .......................... 10-219287

(51) Int. Cl.[7] ............................... H04B 1/38
(52) U.S. Cl. .................... 455/561; 455/562.1
(58) Field of Search .................. 455/561, 562.1, 455/101, 269, 272, 278.1; 342/359, 368, 382

(56) References Cited

U.S. PATENT DOCUMENTS

| | | | | | |
|---|---|---|---|---|---|
| 4,752,969 | A | * | 6/1988 | Rilling .................... | 455/278.1 |
| 5,218,359 | A | * | 6/1993 | Minamisono ............... | 342/383 |
| 5,396,256 | A | | 3/1995 | Chiba et al. | |
| 5,602,555 | A | * | 2/1997 | Searle et al. ................ | 342/374 |
| 5,854,612 | A | * | 12/1998 | Kamiya et al. ............. | 342/383 |
| 6,064,338 | A | * | 5/2000 | Kobayakawa et al. ...... | 342/378 |
| 6,122,260 | A | * | 9/2000 | Liu et al. .................... | 370/280 |
| 6,188,915 | B1 | * | 2/2001 | Martin et al. ............... | 455/562 |

FOREIGN PATENT DOCUMENTS

| | | |
|---|---|---|
| EP | 0807989 | 11/1997 |
| EP | 0869577 | 10/1998 |
| JP | 6196921 | 7/1994 |
| JP | 8274687 | 10/1996 |
| JP | 10117162 | 5/1998 |
| JP | 10285092 | 10/1998 |
| WO | 9700543 | 1/1997 |

OTHER PUBLICATIONS

PCT International Search Report dated Nov. 2, 1999.

Takeo Ohgane, "Spectral efficiency improvement by base station antenna pattern control for land mobile cellular systems,"Technical Report of IEICE, MW93–25, RCS93–8 (May 1993), pp. 55–60 (in Japanese w/abstract in English); together with Takeo Ohgane, "Spectral Efficiency Improvement by Base Station Antenna Pattern Control for Land Mobile Cellular Systems," IEICE Trans. Commun., vol. E77–B, No. 5, May 1994, pp. 598–605 (in English).

Gregory G. Raleigh et al., "A Blind Adaptive Transmit Antenna Algorithm for Wireless Communication," IEEE, 0–7803–2486–2/95, pp. 1494–1499 (in English).

Tadashi Matsumoto et al., "A Technical Survey and Future Prospects of Adaptive Array Antennas in Mobile Communications," New Technical Report, NTT DoCoMo, vol. 5, No. 4, pp. 25–34 (in Japanese w/abstract in English).

* cited by examiner

Primary Examiner—Erika Gary
(74) Attorney, Agent, or Firm—Stevens, Davis, Miller & Mosher, LLP

(57) ABSTRACT

A base station apparatus of the present invention detects a timing for each incoming signal, performs adaptive array antenna reception with the timing for each incoming signal, calculates a received level of a desired signal using a power level of adaptive array antenna received result for each incoming signal, selects a weight for the adaptive array antenna received result with a higher received level of the desired signal, selects a timing of the desired signal with the higher received level, controls the transmission timing based on the selected timing, and transmits a signal with the selected weight.

12 Claims, 13 Drawing Sheets

BASE STATION DEVICE AND RADIO COMMUNICATION METHOD

RELATED APPLICATION

This application is a 371 of PCT/JP99/03943, filed Jul. 23, 1999.

TECHNICAL FIELD

The present invention relates to a base station apparatus and radio communication method in a radio communication system with, for example, portable telephones.

BACKGROUND ART

A conventional base station apparatus in a radio communication system is explained. FIG. 1 is a block diagram illustrating a configuration of the conventional base station apparatus. Signals received from antennas 1 to 3 are input as received signals to radio reception section 10 respectively through duplexers 4 to 6.

The received signals 7 to 9 are subjected to amplification, frequency conversion, and A/D conversion in radio reception section 10, and output as baseband signals or IF signals 11 to 13 to timing detection section 16, respectively. Timing detection section 16 detects an optimal timing from the signals, and outputs detected signal 17 to adaptive array antenna receiver 14. Further, baseband signals or IF signals 11 to 13 are combined in adaptive array antenna receiver 14, and the resultant signal is output to radiation pattern forming section 21 as combined signal 15. Radiation pattern forming section 21 forms a radiation pattern for transmission.

Meanwhile, transmission signal 18 is modulated in modulation section 19, input to radiation pattern forming section 21, and output therefrom as signals 22 to 24. Signals 22 to 24 are subjected to D/A conversion and frequency conversion in radio transmission section 25, output to duplexers 4 to 6 as transmission signals 26 to 28, and then transmitted from antennas 1 to 3. At this time, transmission timing control section 29 outputs transmission timing control signal 30 to modulation section 19, radiation pattern forming section 21 and radio transmission section 25, in each of which the transmission timing is controlled.

The propagation model in a radio communication is explained using the base station apparatus with the above-mentioned configuration. As an example, it is assumed that the number of antennas of each of base station apparatuses 41 and 50 is three. As illustrated in FIG. 2A, in an uplink (transmission from a terminal to a base station), a signal transmitted from terminal apparatus 45 through antenna 46 arrives at antennas 42 to 44 of base station apparatus 41 while being reflected by, for example, mountain 47. Further, as illustrated in FIG. 2B, in a downlink (transmission from the base station to the terminal), a signal transmitted from base station apparatus 50 through antennas 51 to 53 arrives at antenna 55 of terminal apparatus 54 while being reflected by, for example, mountain 56.

The thus obtained propagation paths 48, 49, 57 and 58 are called multipath propagation path, and a technique for compensating the multipath propagation is called equalizing. The communication quality generally deteriorates when the multipath propagation cannot be compensated. To suppress the multipath propagation, it is desired to transmit a signal with either of propagation paths 57 or 58.

Further, in the multipath propagation, the communication quality varies in propagation paths 57 and 58 respectively as the terminal moves. Accordingly, in the multipath propagation, it is important to detect a direction (path) in which an optimal communication quality is obtained.

However, in the conventional base station apparatus, since the weight for transmission is not selected based on the received level of the desired signal of the received signal obtained by adaptive array antenna combining, a signal cannot be transmitted with an optimal weight, resulting in the problem that the apparatus does not recognize whether the level of the desired signal for a communication partner is increased.

Further, in the case where an optimal propagation path, in other words, a transmission weight, is selected to transmit a signal, the timing arriving at the communication partner varies each time the transmission timing is selected, resulting in the problem that the timing detection at the communication partner becomes difficult.

Furthermore, in a spread spectrum communication system, when a residual left after the transmission timing is adjusted within a unit chip, the orthogonality of codes of the spread spectrum transmission signals deteriorates, resulting in the problem that the received quality deteriorates.

DISCLOSURE OF INVENTION

An object of the present invention is to achieve a base station apparatus capable of recognizing a state of power of a desired signal of a communication partner, and facilitating timing detection of the communication partner.

The inventors of the present invention pay attention to that a radiation pattern is formed by controlling weights in adaptive array antenna processing, and thereby an unnecessary signal is cancelled and the received quality is improved, found out that the transmission quality can be improved by performing transmission to the direction in which high received quality is obtained, and achieved the present invention.

The main point of the present invention is to detect a timing for each incoming signal, perform adaptive array antenna reception with the timing for each incoming signal, calculate a received level of a desired signal using power of adaptive array antenna received result for each incoming signal, select a weight for the adaptive array antenna received result of the desired signal with a higher received level, select a timing of the desired signal with the higher received level, control the transmission timing based on the selected timing, and transmit a signal with the selected weight.

Thus, since the base station apparatus of the present invention determines a transmission direction from a direction of arrival of the desired signal, the apparatus can transmit a signal only to the direction in which the desired signal comes, thus enabling the transmission side to compensate the multipath propagation.

BEST MODE FOR CARRYING OUT THE INVENTION

Embodiments of the present invention are explained specifically below with reference to attached drawings.

Embodiment 1

Figure 3:
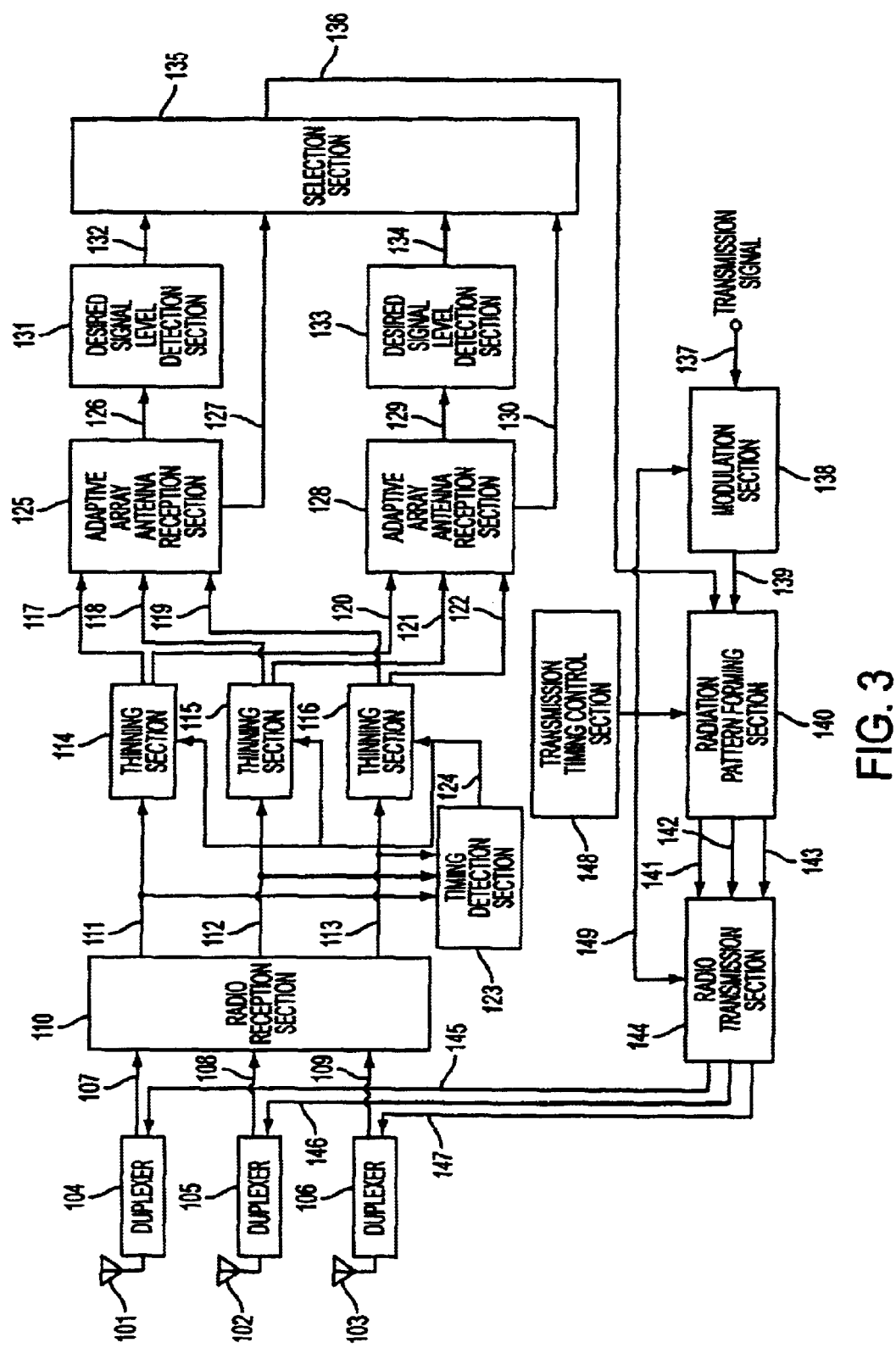
FIG. 3 is a block diagram illustrating a configuration of a base station apparatus according to Embodiment 1 of the present invention.

FIG. 3 is a block diagram illustrating a configuration of a base station apparatus according to Embodiment 1 of the present invention. Signals received at antennas 101 to 103 are input as received signals 107 to 109 to radio reception section 110 respectively through duplexers 104 to 106. Radio reception section 110 executes amplification, frequency conversion, and A/D conversion on the received signals respectively to output as baseband signals or IF signals 111 to 113.

Figure 4:
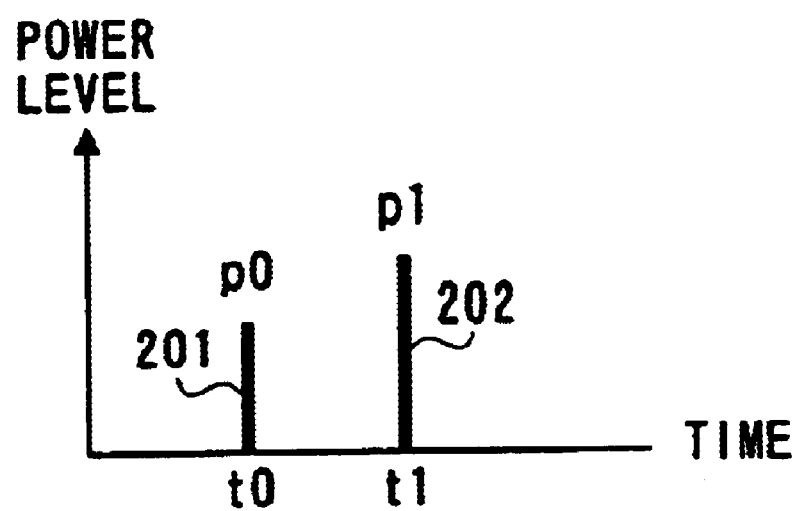
FIG. 4 is a diagram outputs from a timing detection section in the base station apparatus according to the above embodiment.

These signals are output to timing detection section 123. Timing detection section 123 calculates an optimal reception timing. The calculation of the optimal reception timing is, for example, executed as follows: A pattern known in a transmitter and receiver is inserted into a frame, and the transmitter transmits the data. The receiver performs A/D conversion at a rate a few to tens times the symbol time, and performs the correlation calculation with the known symbols. Then, the receiver detects the time at which the correlation calculation result is obtained at a high power level as the optimal reception timing. Specifically, as illustrated in FIG. 4, time to at which power level 201 is p0 and time t1 at which power level 202 is p1 are detected as the optimal reception timings.

Signal 124 at times to and t1 is output to thinning selection sections 114 to 116. Thinning selection sections 114 to 116 output received signals 117 to 119 at time t0 to adaptive array antenna reception section 125, and further output received signals 120 to 122 at time t1 to adaptive array antenna reception section 128, respectively.

Although two adaptive array antenna reception sections are provided herein, the number of adaptive array antenna reception sections is determined as appropriate corresponding to the propagation environment. In such a case, the optimal reception timings of which the number is equivalent to the number of reception sections are detected in descending order of power level of the correlation calculation result in timing detection section 123.

Adaptive array antenna reception sections 125 and 128 combine the respective received signals from three antennas 101 to 103 so that the desired signal is optimized. Then, adaptive array antenna reception sections 125 and 128 respectively output the combined results 126 and 129 and weights 127 and 130 to be multiplied the received signal from each antenna. The combined results 126 and 129 are respectively output to desired signal level detection sections 131 and 133.

Desired signal level detection sections 131 and 133 measure respective received levels of the combined results (desired signals) 126 and 129. The measured received levels are output to selection section 135. At this time, weights 127 and 130 are output to selection section 135. Selection section 135 selects the weight for the desired signal with the higher measured received level.

Meanwhile, transmission signal 137 is data modulated in modulation section 138, and output to radiation pattern forming section 140 as modulated signal 139. Radiation pattern forming section 140 multiplies the modulated signal by weight 136 so as to maximize the desired signal level. Multiplied results 141 to 143 are output to radio transmission section 144, then therein frequency converted and amplified, and transmitted from antennas 101 to 103 as transmission signals 145 to 147 through antenna duplexers 104 to 106, respectively. In addition, the transmission timings at this point are controlled by transmission timing control signal 149 from transmission timing control section 148.

The operation of the base station apparatus with the above-mentioned configuration is explained.

Received signals at the times obtained by the timing detection are subjected to adaptive array antenna processing in adaptive array antenna reception sections 125 and 118 so that desired signals are extracted at the optimal reception timing. Thereby, it is possible to extract the desired signal. This adaptive array antenna reception is described in J. Horikoshi et al. "Waveform Equalizing Technology for Digital Mobile Communications," Triceps Library (TR) 1, pp. 101–116, June 1996.

Figure 5A:
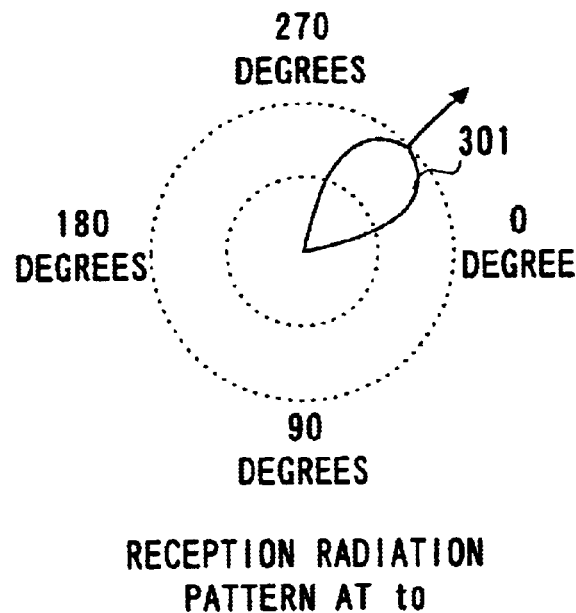
FIGS. 5A and 5B are diagrams illustrating radiation patterns of an adaptive array antenna in the base station apparatus according to the above embodiment.
Figure 5B:
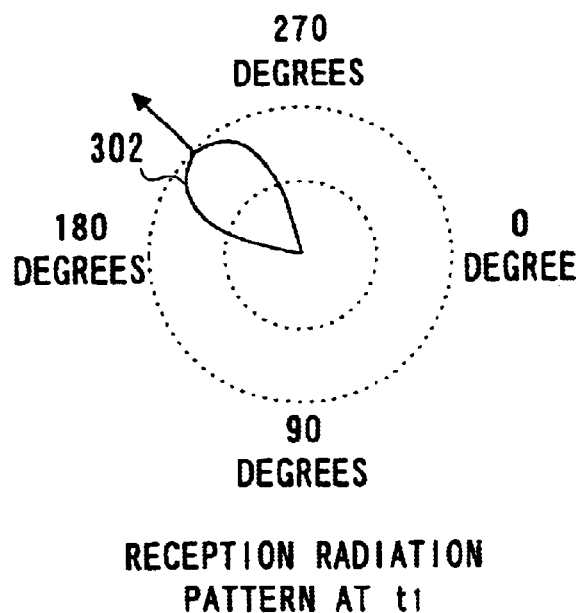

At this point, when the weight is controlled to minimize the mean square error of the output, the radiation pattern points to the desired signal, and a small radiation pattern (called null) is formed in the direction of unnecessary signals (delayed versions of the desired signal arriving at different times due to different propagation paths and signals from another transmitted). In other words, the radiation pattern is formed with the weight. For example, FIG. 5A illustrates radiation pattern 301 at reception time t0, and FIG. 5B illustrates radiation pattern 302 at reception time t1.

Next, adaptive array antenna reception sections 125 and 128 output the resultant signal to desired signal level detection sections 131 and 133, which calculate the received power level of the respective desired signals to detect the desired signal received levels. The calculated received levels 132 and 134 are output to selection section 135. Selection section 135 compares the two levels to select higher one, and at this point, the weight to form the radiation pattern is input to selection section 135.

The weight for the desired signal selected in selection section 135 is output to radiation pattern forming section 140, and based on the weight, the radiation pattern for transmission is formed. A transmission signal is transmitted according to the radiation pattern. At this point, the transmission timing is controlled by transmission timing control section 148.

Thus, according to the base station apparatus of this embodiment, since the weight for transmission is selected with the desired signal power level of the received signal obtained by the adaptive array antenna combining, and the transmission is performed according to the weight, it is possible to perform the transmission in the direction in which the received condition is good. Therefore, since a signal is not transmitted in the direction in which the unnecessary signal arrives, it is possible for the transmission side to compensate the multipath propagation. Consequently, it is not necessary for a receiver to be provided with highly techniques such as an equalizer.

Further, according to the base station apparatus of this embodiment, since a signal is not transmitted in the direction in which the unnecessary signal arrives, the area that the transmitted signal reaches becomes small. Therefore, it is possible to improve the spectral efficiency in the downlink. Furthermore, since the reversibility of the propagation path is utilized, it is possible to transmit in the downlink (uplink) a signal using a propagation path in which the desired signal power level in the uplink (downlink) is high, and as a result, the desired signal power level in the downlink (uplink) becomes larger.

Embodiment 2

Figure 1:
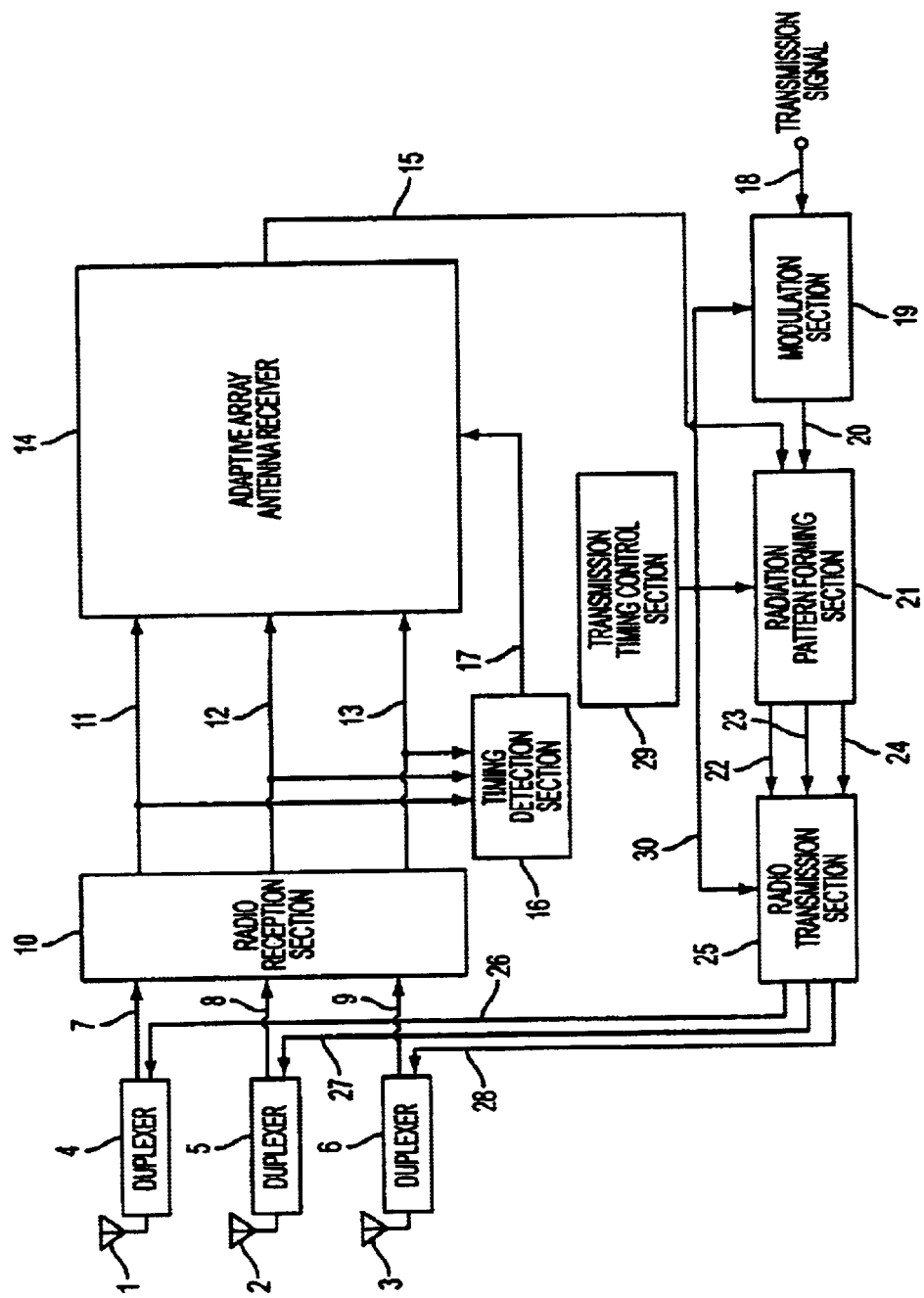
FIG. 1 is a block diagram illustrating a configuration of a conventional base station apparatus.
Figures 2A, 2B:
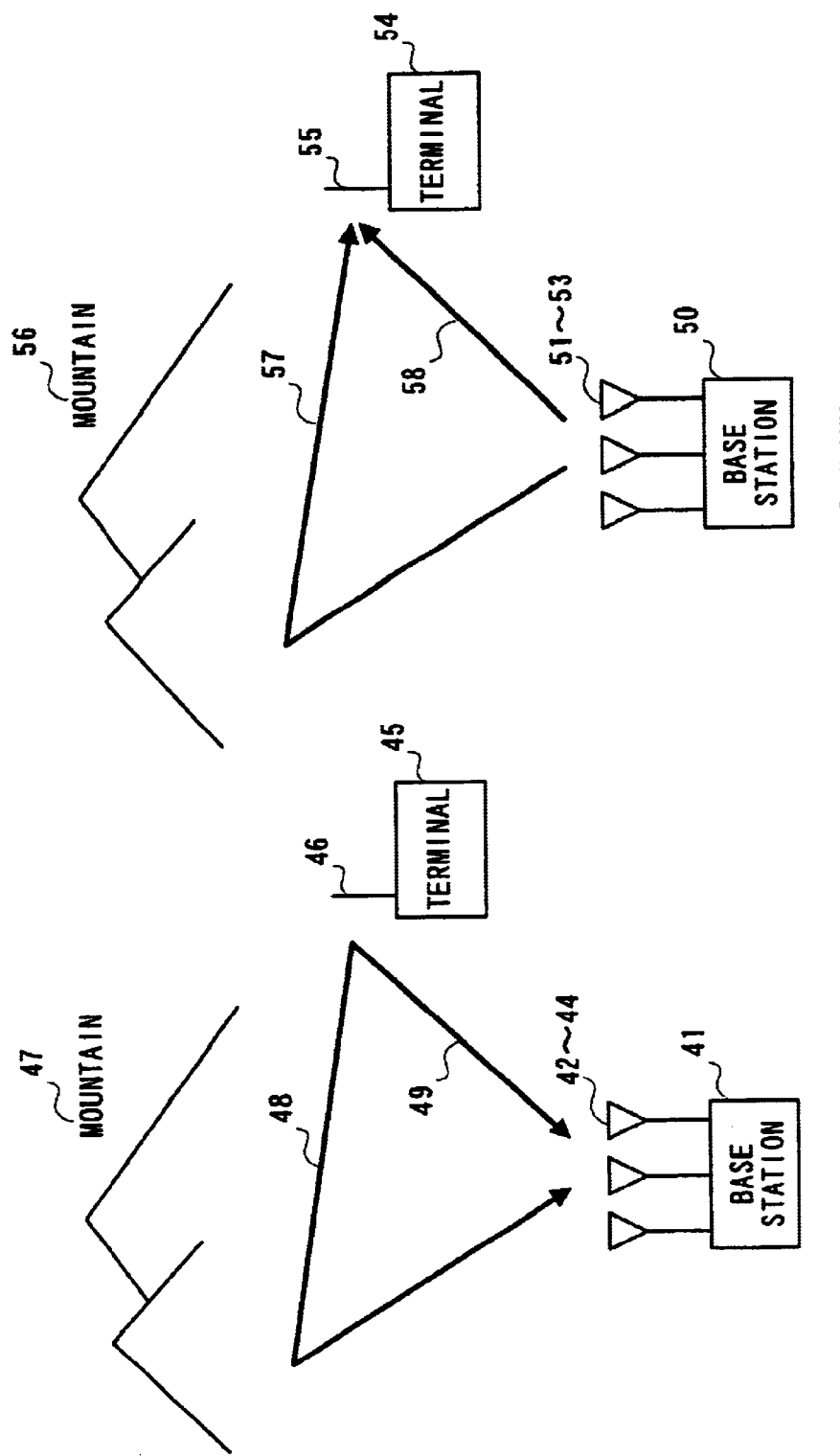
FIGS. 2A and 2B are diagrams to explain a propagation model in a radio communication system.

The base station apparatus of Embodiment 1 transmits a signal with the radiation pattern that maximizes the received desired signal power level. In the case where the time that maximizes the desired signal power level varies, as illustrated in FIG. 2, when a reflected signal from a remote reflective object arrives at a communication partner, the timing at which the signal arrives at the communication partner varies. Accordingly, such a case makes it difficult for the communication partner to accurately detect the timing of the received signal. Therefore, Embodiment 2 explains the case that the transmission is performed while correcting the timing at which the signal arrives at a communication partner to be constant, whereby the difficulties of timing detection at the communication partner are reduced.

Figure 6:
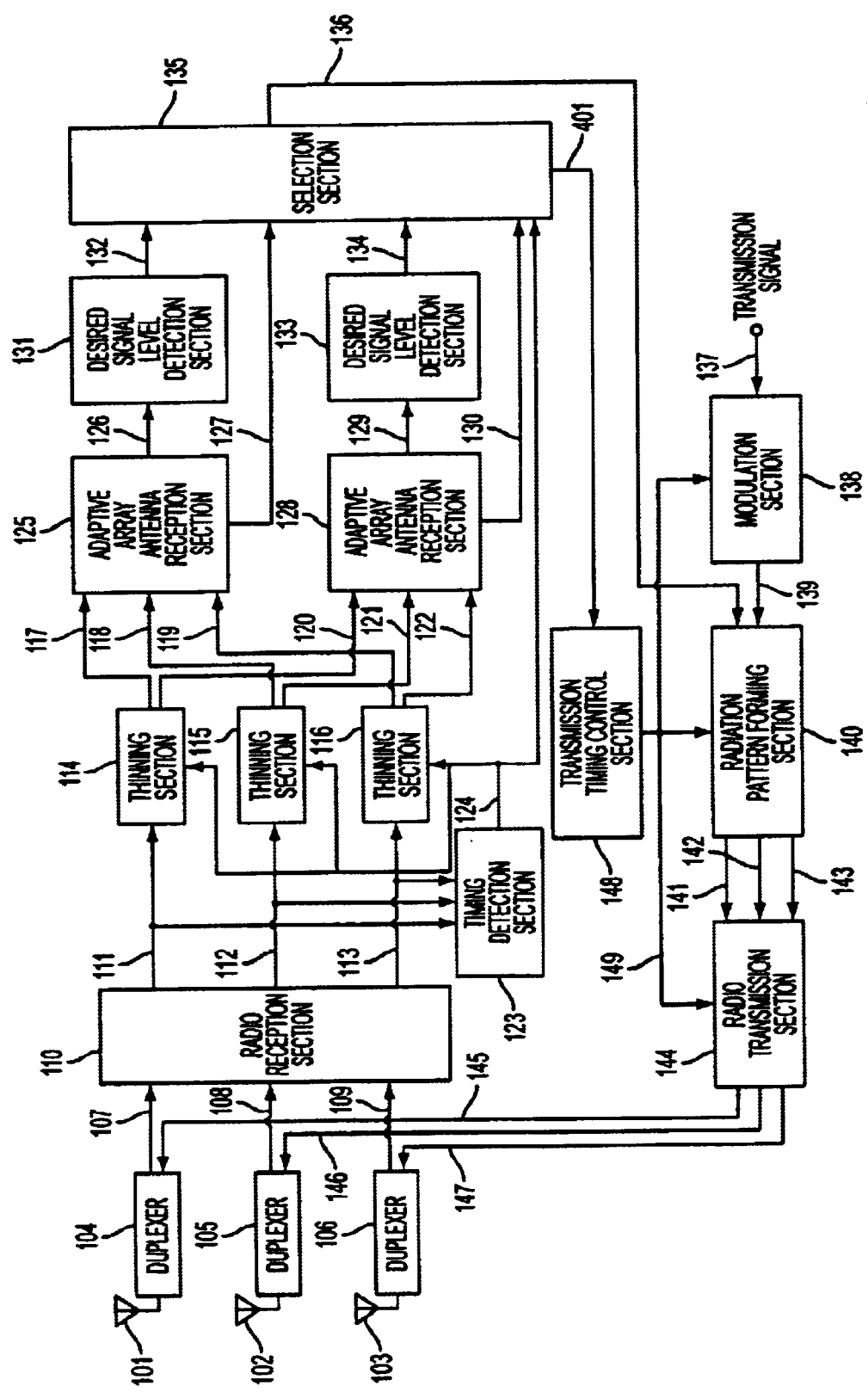
FIG. 6 is a block diagram illustrating a configuration of a base station apparatus according to Embodiment 2 of the present invention.

FIG. 6 is a block diagram illustrating a configuration of a base station apparatus according to Embodiment 2 of the present invention. In the base station apparatus in FIG. 6, the same section as in the base station illustrated in FIG. 3 is given the same mark as in FIG. 3 to omit the explanation thereof.

In the base station apparatus illustrated FIG. 6, time information 401 indicative of the time at which the maximum received level of the desired signal is obtained, selected in selection section 135, is output to transmission timing control section 148, and based on time information 401, the transmission timing is controlled.

The operation of the base station apparatus with the above-mentioned configuration is explained.

Received signals at the times obtained by the timing detection are subjected to adaptive array antenna processing in adaptive array antenna reception sections 125 and 128 so that desired signals are extracted at the optimal reception timing. Thereby, it is possible to extract the desired signal.

Next, adaptive array antenna reception sections 125 and 128 output the resultant signal to desired signal level detection sections 131 and 133, which calculate the received power level of the respective desired signals to detect the desired signal received levels. The calculated received levels are output to selection section 135. Selection section 135 compares the two levels to select higher one, and at this point, the weight to form the radiation pattern is input to selection section 135. The weight for the desired signal selected in selection section 135 is output to radiation pattern forming section 140, and based on the weight, the radiation pattern for transmission is formed.

Received signals at the times obtained by the timing detection are subjected to adaptive array antenna processing in adaptive array antenna reception sections 125 and 128 so that desired signals are extracted at the optimal reception timing. Thereby, it is possible to extract the desired signal. This adaptive array antenna reception is described in J. Horikoshi et al. "Waveform Equalizing Technology for Digital Mobile Communications," Triceps Library (TR) 1, pp. 101–116, June 1996.

At this point, when the weight is controlled to minimize the mean square error of the output, the radiation pattern points to the desired signal, and a small radiation pattern (called null) is formed in the direction of unnecessary signals (delayed versions of the desired signal arriving at different times due to different propagation paths or signals from another transmitted). In other words, the radiation pattern is formed with the weight. For example, FIG. 5A illustrates radiation pattern 301 at reception time t0, and FIG. 5B illustrates radiation pattern 302 at reception time t1.

Next, adaptive array antenna reception sections 125 and 128 output the resultant signal to desired signal level detection sections 131 and 133, which calculate the received power level of the respective desired signals to detect the desired signal received levels. The calculated received levels are output to selection section 135. Selection section 135 compares the two levels to select higher one, and at this point, the weight to form the radiation pattern is input to selection section 135.

The weight for the desired signal selected in selection section 140 is output to radiation pattern forming section 140, and based on the weight, the radiation pattern for transmission is formed. The timing corresponding to the desired signal selected in selection section 135 is output to transmission timing control section 148. Then, in the same way as in Embodiment 1, a transmission signal is transmitted according to the radiation pattern. At this point, the transmission timing is controlled based on the selected timing.

For example, it is assumed that the time required for propagation path A is t0 and that the time required for propagation path B is t1. In the case where mobile station (MS) transmits signal S to base station (BS), the reception side receives signal S0 passed through propagation path A and signal S1 passed through propagation path B. Therefore, the time taken for signal S0 to pass through the propagation is t0, and the time taken for signal S1 to pass through the propagation path is t1.

Since the directional transmission is assumed herein, when the BS transmits a signal at time T, the signal is transmitted through either of propagation path A or B. Accordingly, the reception time of the signal through propagation path A is T+t0, and the reception time of the signal through propagation path B is T+t1. To make the times at which the signals arrive at the MS same, when propagation path A is a reference, it is necessary to transmit at time of T−(t1−t0). Accordingly, the transmission is controlled to transmit a signal faster by t1−t0. In other words, a signal is transmitted at a timing faster than the standard transmission timing by a time difference between the time at which the desired signal is received with the maximum level and the time at which the desired signal is received with the second maximum level. Thus, since the transmission timing is controlled based on the maximum level reception time, the communication partner side can perform correct timing detection.

Thus, according to the base station apparatus of this embodiment, the weight for transmission is selected with the desired signal power level of the received signal obtained by the adaptive array antenna combining, the transmission is performed according to the weight, and concurrently the transmission timing is controlled based on the timing of the selected desired signal. Therefore, it is possible to transmit a signal while correcting the timing at which the signal arrives at the communication partner to be constant, and to reduce the difficulties of timing detection at the communication partner, when the time that maximizes the received desired signal power level varies, in addition to the effects obtained in Embodiment 1.

Embodiment 3

Figure 7:
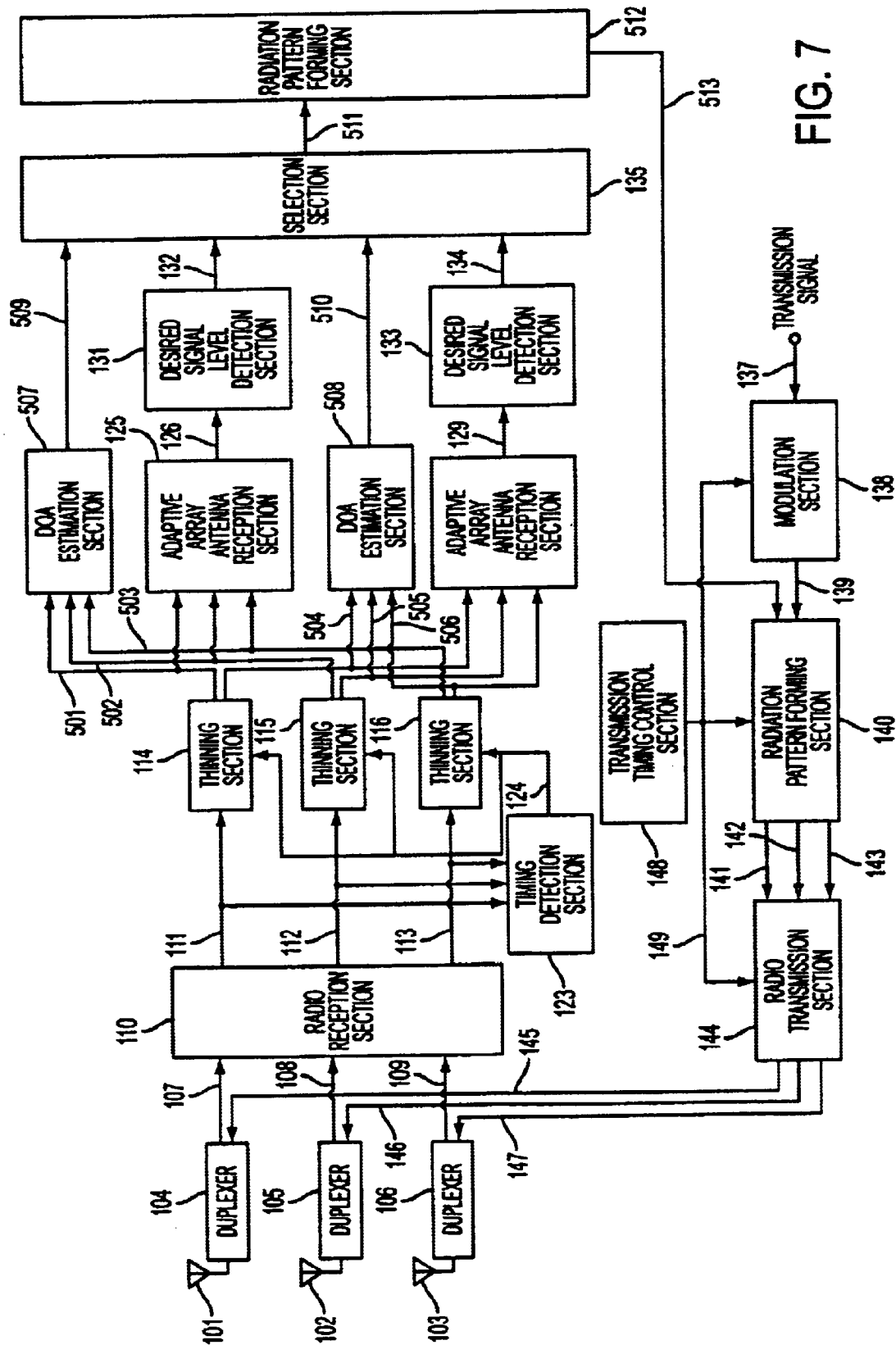
FIG. 7 is a block diagram illustrating a configuration of a base station apparatus according to Embodiment 3 of the present invention.

FIG. 7 is a block diagram illustrating a configuration of a base station apparatus according to Embodiment 3 of the present invention. In the base station apparatus illustrated in FIG. 7, the same section as in the base station illustrated in FIG. 3 is given the same mark as in FIG. 3 to omit the explanation thereof.

The base station apparatus illustrated FIG. 7 is provided with DOA (Direction of Arrival) estimation sections 507 and 508 which respectively estimate the direction of arrival of a desired signal of the received signal at time t0 or t1 selected in thinning selection sections 114 to 116, and further with radiation pattern forming section 512 which calculates the weight to form the radiation pattern based on the direction of arrival of the desired signal with the maximum desired signal received level selected in selection section 135.

The operation of the base station apparatus with the above-mentioned configuration is explained.

Received signals at the times obtained by the timing detection are subjected to adaptive array antenna processing in adaptive array antenna reception sections 125 and 128 so that desired signals are extracted at the optimal reception timing. Thereby, it is possible to extract the desired signal. Further, received signals 501 to 503 and 504 to 506 are respectively output to DOA estimation sections 507 and 508. DOA estimation section 507 estimates the direction of arrival of the desired signal of the received signal at time t0, and outputs the estimated direction of arrival to selection section 135. DOA estimation section 508 estimates the direction of arrival of the desired signal of the received signal at time t1, and outputs the estimated direction of arrival to selection section 135.

The DOA (Direction of Arrival) estimation technique is, for example, explained in "Adaptive Signal Processing Technology with Array Antenna and Introduction Course for High-Resolution Arrival Wave Estimation," N. Kikuma, pp. 62–76, October 1997, published by the IEICE (Institute of Electronics, Information and Communication Engineers). Further, the radiation pattern forming technique is described in "Antenna Engineering Handbook," IEICE ed. pp. 200–205, October 1980, published by Ohmsha.

For example, when a simply example is considered that antennas, of which the number is N, are installed at equal intervals d in a straight line, the radiation pattern is expressed with the following equations (1) to (3).

$$E(u) = \sum_{n=0}^{N-1} I_n \exp(jnu) \qquad (1)$$

$$= \sum_{n=0}^{N-1} I_n \exp(-jnkd\cos\theta_0)\exp(jnkd\cos\theta)$$

$$= \sum_{n=0}^{N-1} I'_n \exp(jnkd\cos\theta)$$

$$u = kd(\cos\theta - \cos\theta_0) \qquad (2)$$

$$I'_n = I_n \exp(-jnkd\cos\theta_0) \qquad (3)$$

where In' is a current (complex with an amplitude and phase) to be provided to the nth antenna, k is the wavenumber, $\theta$ is a direction to which the radiation pattern is expected to point, and $\theta$ is a variable to draw the radiation pattern. To simplify the explanation, when it is assumed that In has the same phase and same amplitude, in other words, In=1.0, providing each antenna with exp (−jnkd ·cos $\theta$ ) makes the radiation pattern point to the direction of $\theta$.

Selection section 135 selects the direction of arrival of the desired signal with the higher detected received level, and outputs the direction of arrival to radiation pattern forming section 512. Based on the direction of arrival, radiation pattern forming section 512 calculates the weight to form the radiation pattern. Weight 513 is output to radiation pattern forming section 140 of the transmission site.

The transmission site forms the radiation pattern for transmission based on the weight calculated in radiation pattern forming section 512 of the reception site. The transmission signal is, in the same way as in Embodiment 1, transmitted according to the radiation pattern. At this point, the transmission timing is controlled by transmission timing control section 148.

Thus, according to the base station apparatus of this embodiment, since the direction for transmission is selected with the desired signal power level of the received signal obtained by the adaptive array antenna combining, the weight is calculated based on the selected direction, the radiation pattern for transmission is formed using the weight, and the transmission is performed according to the radiation patter, it is possible to perform the transmission only in the direction of the desired signal arriving arrives, enabling the transmission side to compensate the multipath propagation. Consequently, it is not necessary for a receiver to be provided with highly techniques such as an equalizer.

Further, according to the base station apparatus of this embodiment, since a signal is transmitted only in the direction of the desired signal arriving arrives, the area that the transmitted signal reaches becomes small. Therefore, it is possible to improve the spectral efficiency in the downlink. Furthermore, since the reversibility of the propagation path is utilized, it is possible to transmit in the downlink (uplink) a signal with a propagation path in which the desired signal power level in the uplink (downlink) is high, and as a result, the desired signal power level in the downlink (uplink) becomes larger.

Embodiment 4

The base station apparatus of Embodiment 3 transmits a signal with the radiation pattern that maximizes the received desired signal power level. In the case where the time that maximizes the desired signal power level varies, as illustrated in FIG. 2, when a reflected signal from a remote reflective object arrives at a communication partner, the timing at which the signal arrives at the communication partner varies. Accordingly, such a case makes it difficult for the communication partner to accurately detect the timing of the received signal. Therefore, Embodiment 4 explains the case that the transmission is performed while correcting the timing at which the signal arrives at a communication partner to be constant, whereby the difficulties of timing detection at the communication partner are reduced.

Figure 8:
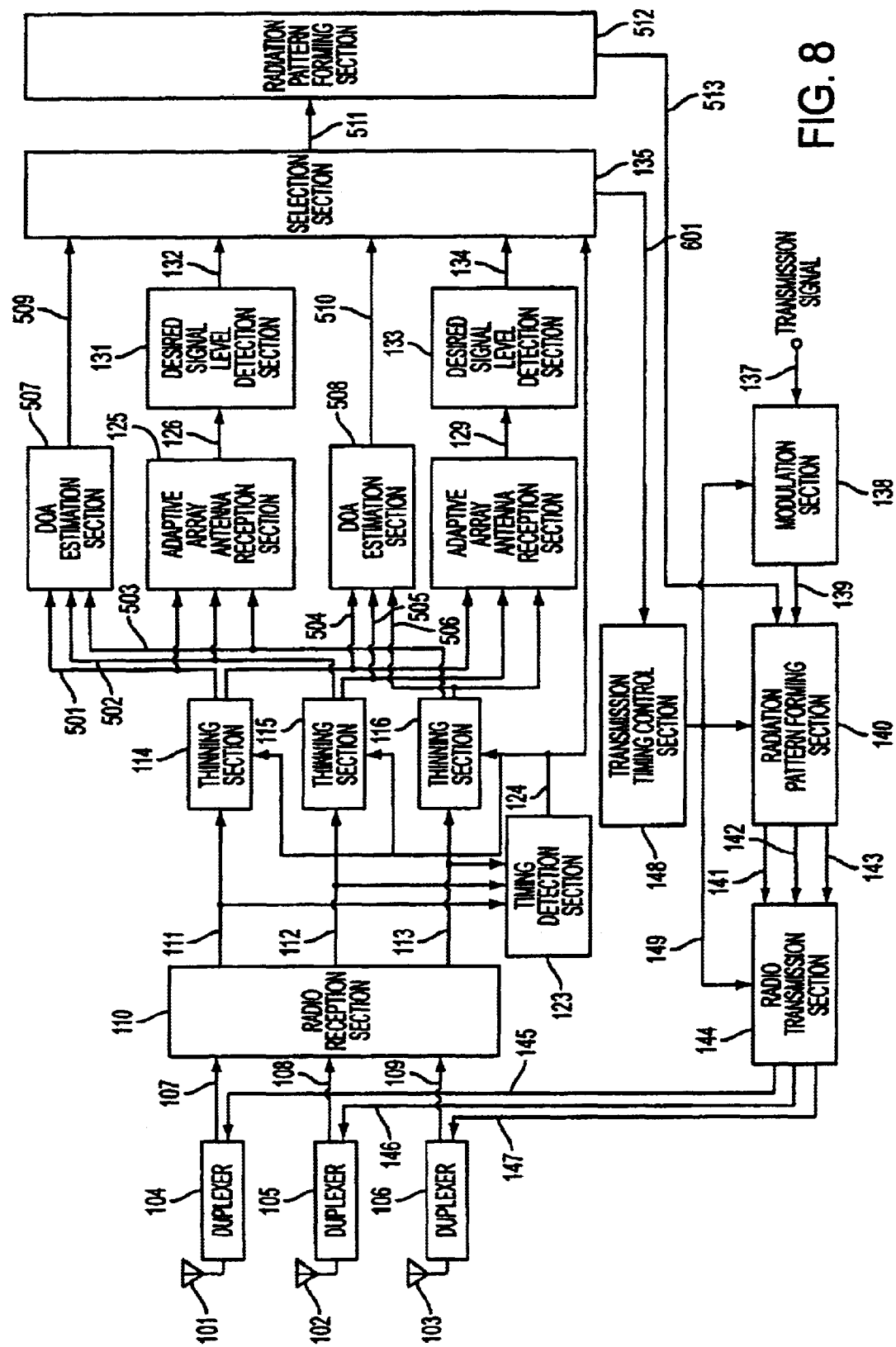
FIG. 8 is a block diagram illustrating a configuration of a base station apparatus according to Embodiment 4 of the present invention.

FIG. 8 is a block diagram illustrating a configuration of a base station apparatus according to Embodiment 4 of the present invention. In the base station apparatus in FIG. 8, the same section as in the base station apparatus illustrated in FIG. 7 is given the same mark as in FIG. 7 to omit the explanation thereof.

In the base station apparatus illustrated FIG. 8, time information 601 indicative of the time at which the maximum received level of the desired signal is obtained, selected in selection section 135, is output to transmission timing control section 148, and based on time information 601, the transmission timing is controlled.

The operation of the base station apparatus with the above-mentioned configuration is explained.

Received signals at the times obtained by the timing detection are subjected to adaptive array antenna processing in adaptive array antenna reception sections 125 and 128 so that desired signals are extracted at the optimal reception timing. Thereby, it is possible to extract the desired signal. Further, received signals 501 to 503 and 504 to 506 are respectively output to DOA estimation sections 507 and 508. In the same way as in Embodiment 3, DOA estimation section 507 estimates the direction of arrival of the desired signal of the received signal at time t0, and outputs the estimated direction of arrival to selection section 135. DOA estimation section 508 estimates the direction of arrival of the desired signal of the received signal at time t1, and outputs the estimated direction of arrival to selection section 135.

Selection section 135 selects the direction of arrival of the desired signal with the higher detected received level, and outputs the direction of arrival to radiation pattern forming section 512. Based on the direction of arrival, radiation pattern forming section 512 calculates the weight to form the radiation pattern. Weight 513 is output to radiation pattern forming section 140 of the transmission site.

Timing 601 corresponding to the desired signal selected in selection section 135 is output to transmission timing control section 148. Then, the transmission signal is, in the same way as in Embodiment 2, transmitted according to the radiation pattern, and the transmission timing is controlled based on the selected timing.

Thus, according to the base station apparatus of this embodiment, since the direction for transmission is selected with the desired signal power level of the received signal obtained by the adaptive array antenna combining, the weight is calculated based on the selected direction, the radiation pattern for transmission is formed using the weight, the transmission is performed according to the radiation pattern, and concurrently the transmission timing is controlled based on the timing of the selected desired signal. Therefore, it is possible to transmit a signal while correcting the timing at which the signal arrives at the communication partner to be constant, and to reduce the difficulties of timing detection at the communication partner, when the time that maximizes the received desired signal power level varies, in addition to the effects obtained in Embodiment 3.

Embodiment 5

Figure 9:
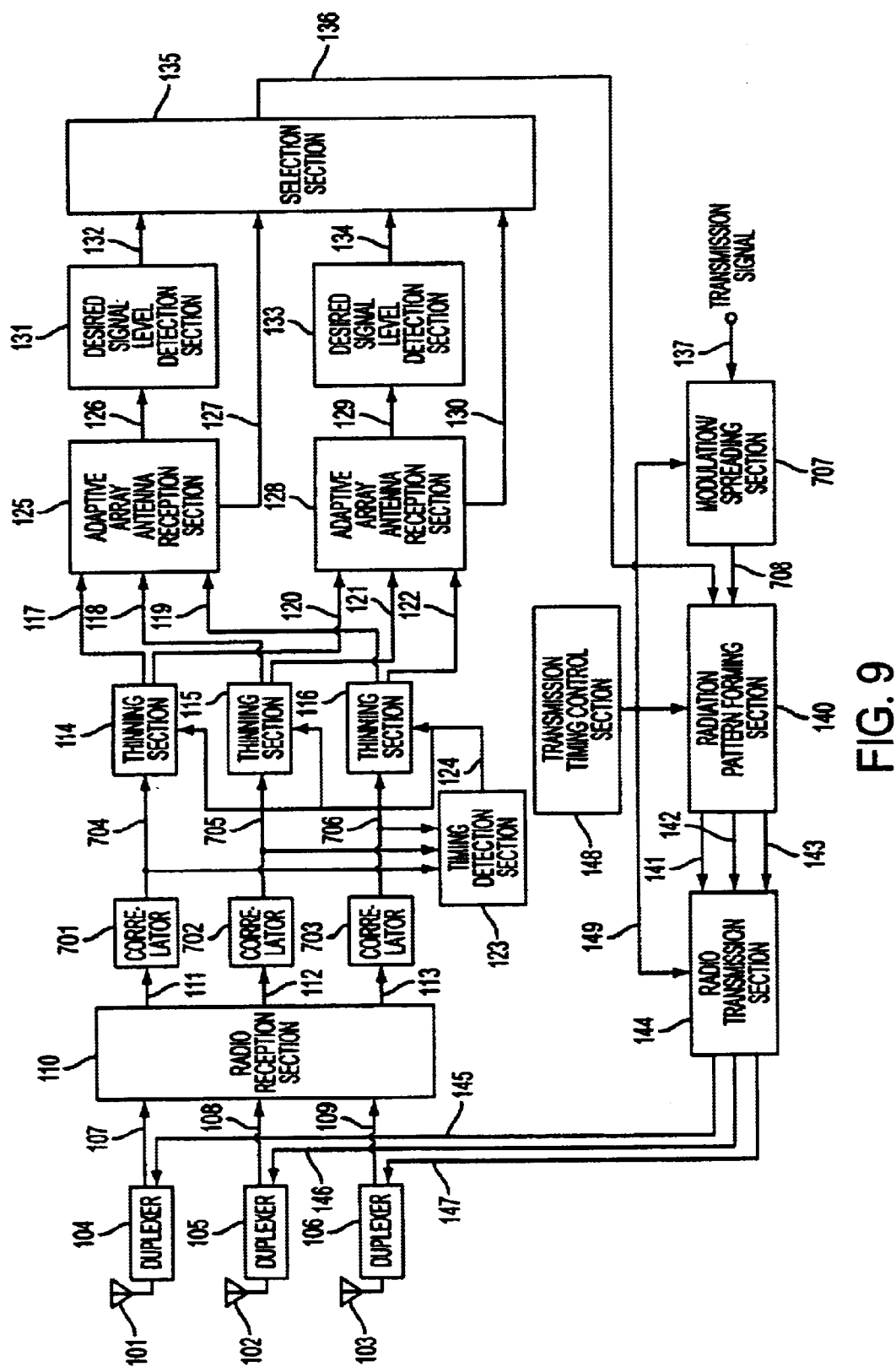
FIG. 9 is a block diagram illustrating a configuration of a base station apparatus according to Embodiment 5 of the present invention.

FIG. 9 is a block diagram illustrating a configuration of a base station apparatus according to Embodiment 5 of the present invention. Signals received at antennas 101 to 103 are input as received signals 107 to 109 to radio reception section 110 through duplexers 104 to 106, respectively. Radio reception section 110 executes amplification, frequency conversion, and A/D conversion on the received signals respectively to output as baseband signals or IF signals 111 to 113.

These signals 111 to 113 are output to correlators 701 to 703, and therein subjected to despreading processing with a spreading code used in the transmission. The despread signals 704 to 706 are output to thinning selection sections 114 to 116, while being outputting to timing detection section 123.

Timing detection section 123 calculates the optimal reception timing, in the same way as in Embodiment 1. Signal 124 at the optimal reception timing is output to thinning selection sections 114 to 116. Thinning selection sections 114 to 116 output received signals 117 to 119 at time t0 to adaptive array antenna reception section 125, and further output received signals 120 to 122 at time t1 to adaptive array antenna reception section 128, respectively.

Although two adaptive array antenna reception sections are provided herein, the number of adaptive array antenna reception sections is determined as appropriate corresponding to the propagation environment. In such a case, the optimal reception timings of which the number is equivalent to the number of reception sections are detected in descending order of power level of the correlation calculation result in timing detection section 123.

Adaptive array antenna reception sections 125 and 128 combine the respective received signals from three antennas 101 to 103 so that the desired signal is optimized. Then, adaptive array antenna reception sections 125 and 128 respectively output the combined results 126 and 129 and weights 127 and 130 to be multiplied the received signal from each antenna. The combined results 126 and 129 are respectively output to desired signal level detection sections 131 and 133.

Desired signal level detection sections 131 and 133 measure respective received levels of the combined results (desired signals) 126 and 129. The measured received levels are output to selection section 135. At this time, weights 127 and 130 are output to selection section 135. Selection section 135 selects the weight for the desired signal with the higher measured received level.

Meanwhile, transmission signal 137 is data modulated and spread with the spreading code in modulation/spreading section 707. The modulated and spread signal 708 is output to radiation pattern forming section 140. Radiation pattern forming section 140 multiplies the modulated signal by weight 136 so as to maximize the desired signal level. Multiplied results 141 to 143 are output to radio transmission section 144, then therein frequency converted and amplified, and transmitted from antennas 101 to 103 through antenna duplexers 104 to 106, respectively. In addition, the transmission timings at this point are controlled by transmission control signal 149 from transmission timing control section 148.

The operation of the base station apparatus with the above-mentioned configuration is explained.

Received signals are subjected to baseband processing in radio reception section 110, and then despreading processing in correlators 701 to 703. Then, the received signals at the times obtained by the timing detection in timing detection section 123 are, in the same way as in Embodiment 1, subjected to adaptive array antenna processing in adaptive array antenna reception sections 125 and 128 so that desired signals are extracted at the optimal reception timing. Thereby, it is possible to extract the desired signal.

Next, adaptive array antenna reception sections 125 and 128 output the resultant signal to desired signal level detection sections 131 and 133, which calculate the received power level of the respective desired signals to detect the desired signal received levels. The calculated received levels are output to selection section 135. Selection section 135 compares the two levels to select higher one, and at this point, the weight to form the radiation pattern is input to selection section 135.

The weight for the desired signal selected in selection section 135 is output to radiation pattern forming section 140, and based on the weight, the radiation pattern for transmission is formed. A transmission signal is transmitted according to the radiation pattern. At this point, the transmission timing is controlled by transmission timing control section 148.

Thus, according to the base station apparatus of this embodiment, also in the radio communication system with the spread spectrum communication system, since the weight for transmission is selected with the desired signal power level of the received signal obtained by the adaptive array antenna combining, and the transmission is performed according to the weight, a signal is not transmitted in the direction in which the unnecessary signal arrives, and it is possible for the transmission side to compensate the multi-path propagation. Consequently, it is not necessary for a receiver to be provided with highly techniques such as an equalizer.

Further, according to the base station apparatus of this embodiment, since a signal is not transmitted in the direction in which the unnecessary signal arrives, the area that the transmitted signal reaches becomes small. Therefore, it is possible to improve the spectral efficiency in the downlink. Furthermore, since the reversibility of the propagation path is utilized, it is possible to transmit in the downlink (uplink) a signal with a propagation path in which the desired signal power level in the uplink (downlink) is high, and as a result, the desired signal power level in the downlink (uplink) becomes larger.

Embodiment 6

The base station apparatus of Embodiment 5 transmits a signal with the radiation pattern that maximizes the received desired signal power level. In the case where the time that maximizes the desired signal power level varies, as illustrated in FIG. 2, when a reflected signal from a remote reflective object arrives at a communication partner, the timing at which the signal arrives at the communication partner varies. Accordingly, such a case makes it difficult for the communication partner to accurately detect the timing of the received signal. Therefore, Embodiment 6 explains the case that the transmission is performed while correcting the timing at which the signal arrives at a communication partner to be constant, whereby the difficulties of timing detection at the communication partner are reduced.

Figure 10:
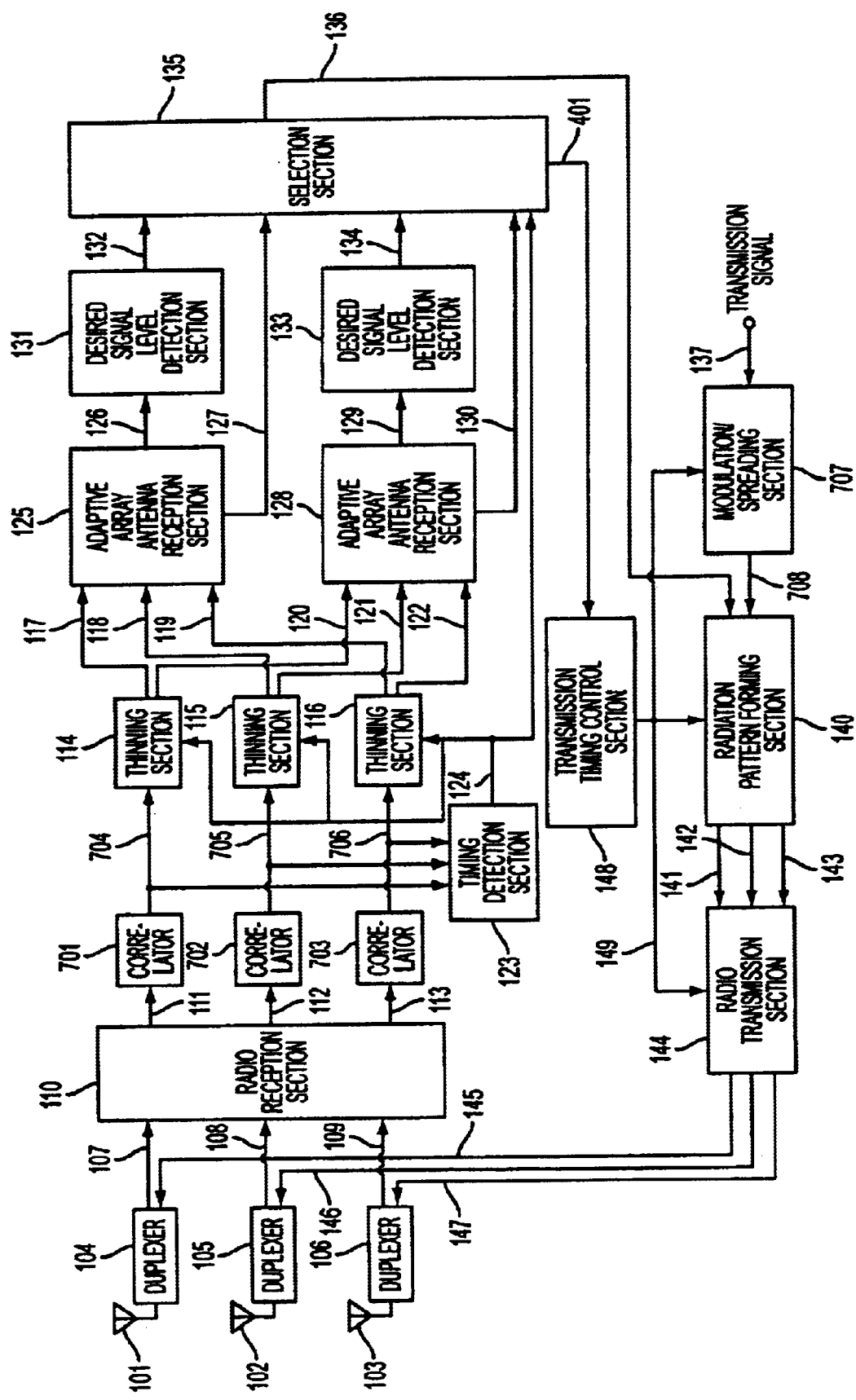
FIG. 10 is a block diagram illustrating a configuration of a base station apparatus according to Embodiment 6 of the present invention.

FIG. 10 is a block diagram illustrating a configuration of a base station apparatus according to Embodiment 6 of the present invention. In the base station apparatus in FIG. 10, the same section as in the base station illustrated in FIG. 9 is given the same mark as in FIG. 9 to omit the explanation thereof.

In the base station apparatus illustrated FIG. 10, time information 401 indicative of the time at which the maximum received level of the desired signal is obtained, selected in selection section 135, is output to transmission timing control section 148, and based on time information 401, the transmission timing is controlled.

The operation of the base station apparatus with the above-mentioned configuration is explained.

Received signals are subjected to baseband processing in radio reception section 110, and then despreading processing in correlators 701 to 703. Then, received signals at the times obtained by the timing detection in timing selection section 123 are subjected to adaptive array antenna processing in adaptive array antenna reception sections 125 and 128 so that desired signals are extracted at the optimal reception timing. Thereby, it is possible to extract the desired signal.

At this point, when the weight is controlled to minimize the mean square error of the output, the radiation pattern points to the desired signal, and a small radiation pattern (called null) is formed in the direction of unnecessary signals (delayed versions of the desired signal arriving at different times due to different propagation paths or signals from another transmitted). In other words, the radiation pattern is formed with the weight.

Next, adaptive array antenna reception sections 125 and 128 output the resultant signal to desired signal level detection sections 131 and 133, which calculate the received power level of the respective desired signals to detect the desired signal received levels. The calculated received levels are output to selection section 135. Selection section 135 compares the two levels to select higher one, and at this point, the weight to form the radiation pattern is input to selection section 135. The weight for the desired signal selected in selection section 135 is output to radiation pattern forming section 140, and based on the weight, the radiation pattern for transmission is formed.

Received signals at the times obtained by the timing detection are subjected to adaptive array antenna processing in adaptive array antenna reception sections 125 and 128 so that desired signals are extracted at the optimal reception timing. Thereby, it is possible to extract the desired signal.

Next, adaptive array antenna reception sections 125 and 128 output the resultant signal to desired signal level detection sections 131 and 133, which calculate the received power level of the respective desired signals to detect the desired signal received levels. The calculated received levels are output to selection section 135. Selection section 135 compares the two levels to select higher one, and at this point, the weight to form the radiation pattern is input to selection section 135.

The weight for the desired signal selected in selection section 140 is output to radiation pattern forming section 140, and based on the weight, the radiation pattern for transmission is formed. The timing corresponding to the desired signal selected in selection section 135 is output to transmission timing control section 148. Then, in the same way as in Embodiment 1, a transmission signal is transmitted according to the radiation pattern. At this point, the transmission timing is controlled based on the selected timing.

For example, it is assumed that the time required for propagation path A is t0 and that the time required for propagation path B is t1. In the case where mobile station (MS) transmits signal S to base station (BS), the reception side receives signal S0 passed through propagation path A and signal S1 passed through propagation path B. Therefore, the time taken for signal S0 to pass through the propagation path is t0, and the time taken for signal S1 to pass through the propagation path is t1.

Since the directional transmission is assumed herein, when the BS transmits a signal at time T, the signal is transmitted through either of propagation path A or B. Accordingly, the reception time of the signal through propagation path A is T+t0, and the reception time of the signal through propagation path B is T+t1. To make the times at which the signals arrive at the MS same, when propagation path A is a reference, it is necessary to transmit at time of T−(t1−t0). Accordingly, the transmission is controlled to transmit a signal faster by t1−t0.

Thus, according to the base station apparatus of this embodiment, also in the radio communication system with the spread spectrum communication system, the weight for transmission is selected with the desired signal power level of the received signal obtained by the adaptive array antenna combining, the transmission is performed according to the weight, and concurrently the transmission timing is controlled based on the timing of the selected desired signal. Therefore, it is possible to transmit a signal while correcting the timing at which the signal arrives at the communication partner to be constant, and to reduce the difficulties of timing detection at the communication partner, when the time that maximizes the received desired signal power level varies, in addition to the effects obtained in Embodiment 1.

Embodiment 7

Figure 11:
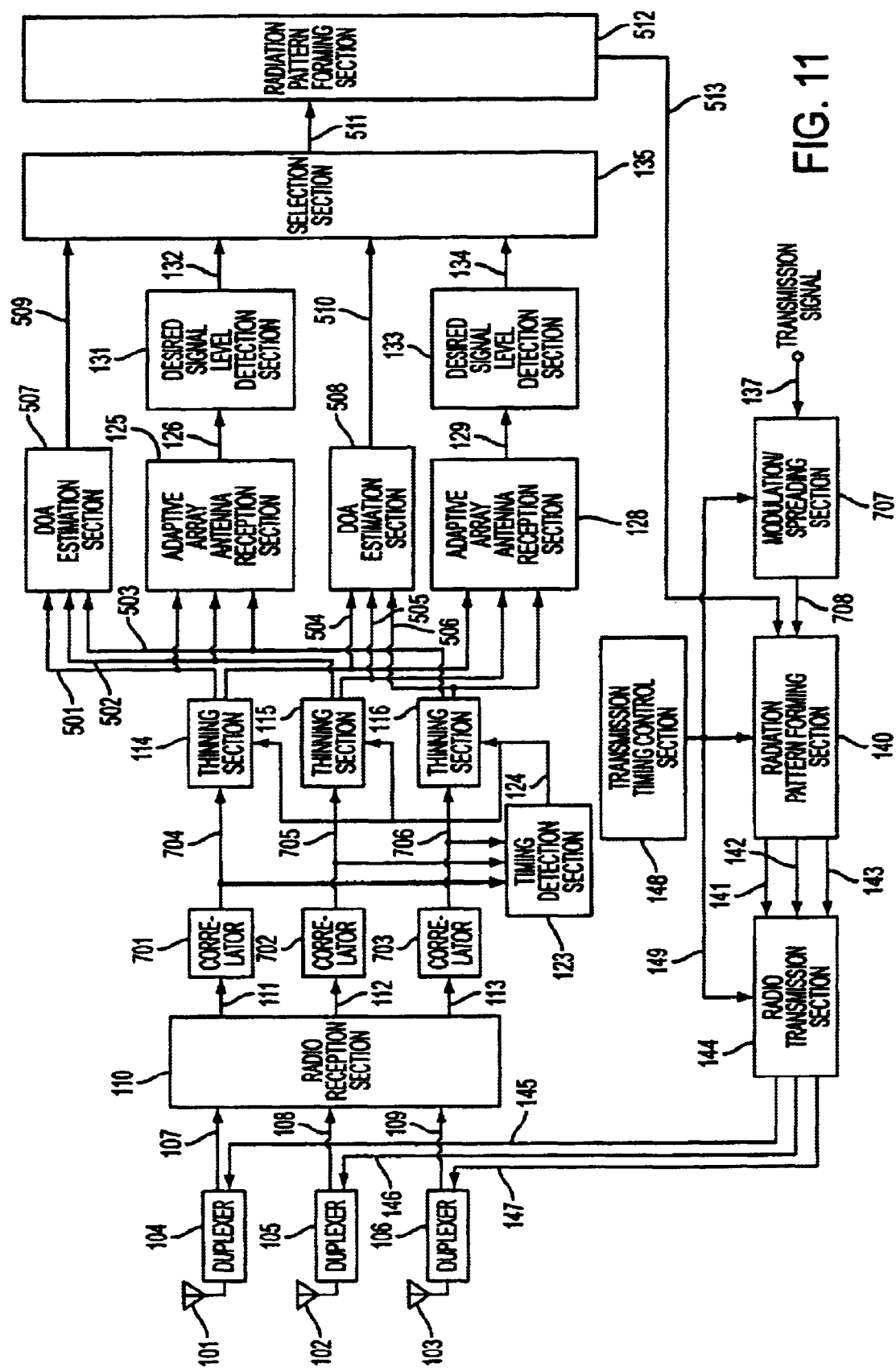
FIG. 11 is a block diagram illustrating a configuration of a base station apparatus according to Embodiment 7 of the present invention.

FIG. 11 is a block diagram illustrating a configuration of a base station apparatus according to Embodiment 7 of the present invention. In the base station apparatus in FIG. 11, the same section as in the base station apparatus illustrated in FIG. 9 is given the same mark as in FIG. 9 to omit the explanation thereof.

The base station apparatus illustrated FIG. 11 is provided with DOA (direction of arrival) estimation sections 507 and 508 which respectively estimate the direction of arrival of a desired signal of the received signal at time t0 or t1 selected in thinning selection sections 114 to 116, and further with radiation pattern forming section 512 which calculates the weight to form the radiation pattern based on the direction of arrival of the desired signal with the maximum desired signal received level selected in selection section 135.

The operation of the base station apparatus with the above-mentioned configuration is explained.

Received signals are subjected to baseband processing in radio reception section 110, and then despreading processing in correlators 701 to 703. Then, received signals at the times obtained by the timing detection in timing detection section 123 are subjected to adaptive array antenna processing in adaptive array antenna reception sections 125 and 128 so that desired signals are extracted at the optimal reception timing. Thereby, it is possible to extract the desired signal. Further, received signals 501 to 503 and 504 to 506 are respectively output to DOA estimation sections 507 and 508. DOA estimation section 507 estimates the direction of arrival of the desired signal of the received signal at time t0, and outputs the estimated direction of arrival to selection section 135. Further, in the same way as in Embodiment 3, DOA estimation section 508 estimates the direction of arrival of the desired signal of the received signal at time t1, and outputs the estimated direction of arrival to selection section 135.

Selection section 135 selects the direction of arrival of the desired signal with the higher detected received level, and outputs the direction of arrival to radiation pattern forming section 512. Based on the direction of arrival, radiation pattern forming section 512 calculates the weight to form the radiation pattern. Weight 513 is output to radiation pattern forming section 140 of the transmission site.

The transmission site forms the radiation pattern for transmission based on the weight calculated in radiation pattern forming section 512 of the reception site. The transmission signal is, in the same way as in Embodiment 1, transmitted according to the radiation pattern. At this point, the transmission timing is controlled by transmission timing control section 148.

Thus, according to the base station apparatus of this embodiment, also in the radio communication system with the spread spectrum communication system, since the direction for transmission is selected with the desired signal power level of the received signal obtained by the adaptive array antenna combining, the weight is calculated based on the selected direction, the radiation pattern for transmission is formed using the weight, and the transmission is performed according to the radiation patter, it is possible to perform the transmission only in the direction of the desired signal arriving arrives, enabling the transmission side to compensate the multipath propagation. Consequently, it is not necessary for a receiver to be provided with highly techniques such as an equalizer.

Further, according to the base station apparatus of this embodiment, since a signal is transmitted only in the direction of the desired signal arriving arrives, the area that the transmitted signal reaches becomes small. Therefore, it is possible to improve the spectral efficiency in the downlink. Furthermore, since the reversibility of the propagation path is utilized, it is possible to transmit in the downlink (uplink) a signal with a propagation path in which the desired signal power level in the uplink (downlink) is high, and as a result, the desired signal power level in the downlink becomes larger.

Embodiment 8

The base station apparatus of Embodiment 7 transmits a signal with the radiation pattern that maximizes the received desired signal power level. In the case where the time that maximizes the desired signal power level varies, as illustrated in FIG. 2, when a reflected signal from a remote reflective object arrives at a communication partner, the timing at which the signal arrives at the communication partner varies. Accordingly, such a case makes it difficult for the communication partner to accurately detect the timing of the received signal. Therefore, Embodiment 8 explains the case that the transmission is performed while correcting the timing at which the signal arrives at a communication partner to be constant, whereby the difficulties of timing detection at the communication partner are reduced.

Figure 12:
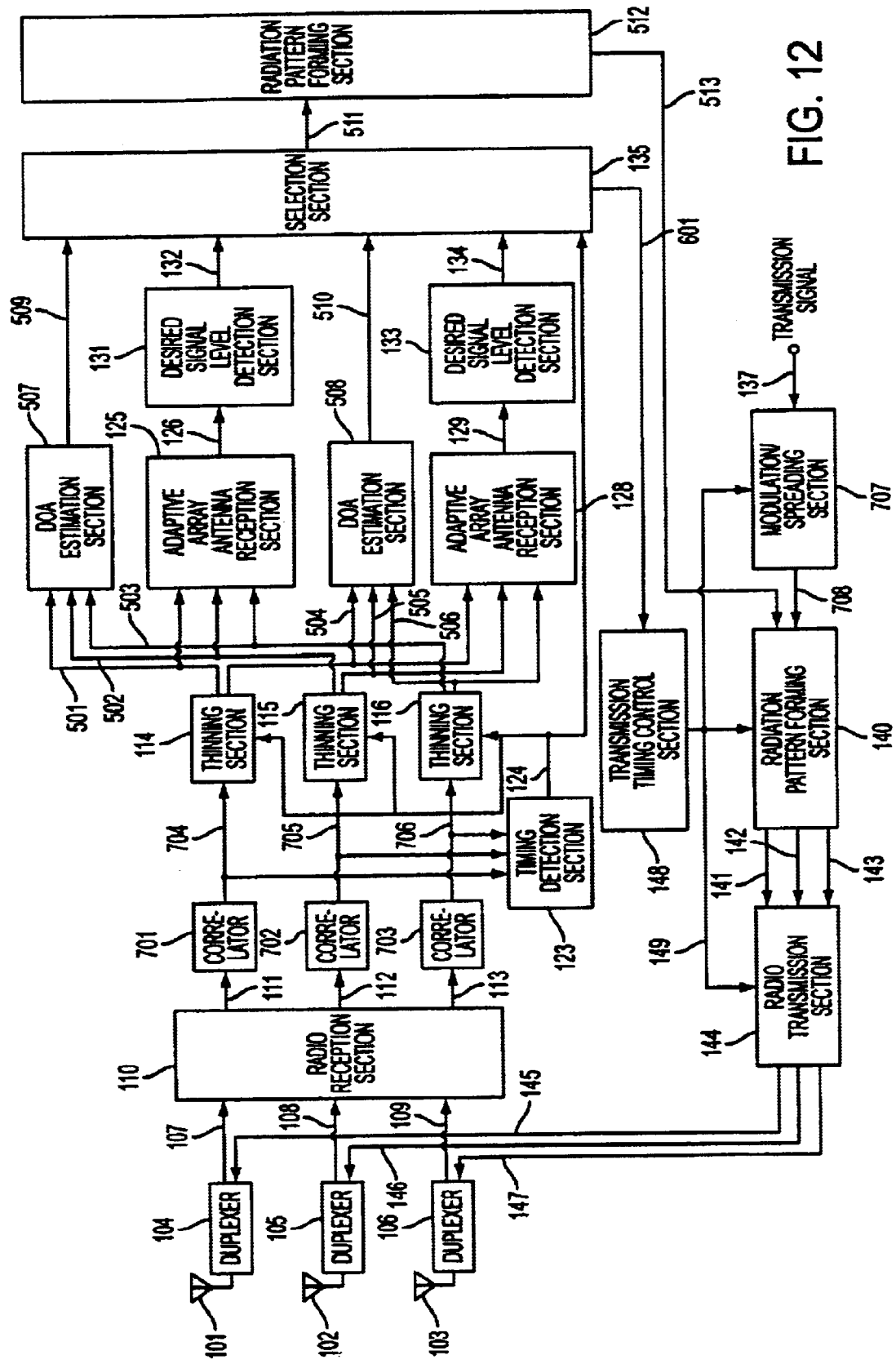
FIG. 12 is a block diagram illustrating a configuration of a base station apparatus according to Embodiment 8 of the present invention.

FIG. 12 is a block diagram illustrating a configuration of a base station apparatus according to Embodiment 8 of the present invention. In the base station apparatus in FIG. 12, the same section as in the base station apparatus illustrated in FIG. 11 is given the same mark as in FIG. 11 to omit the explanation thereof.

In the base station apparatus illustrated FIG. 12, time information 601 indicative of the time at which the maximum received level of the desired signal is obtained, selected in selection section 135, is output to transmission timing control section 148, and based on time information 601, the transmission timing is controlled.

The operation of the base station apparatus with the above-mentioned configuration is explained.

Received signals are subjected to baseband processing in radio reception section 110, and then despreading processing in correlators 701 to 703. Then, received signals at the times obtained by the timing detection in timing detection section 123 are subjected to adaptive array antenna processing in adaptive array antenna reception sections 125 and 128 so that desired signals are extracted at the optimal reception timing. Thereby, it is possible to extract the desired signal. Further, received signals 501 to 503 and 504 to 506 are respectively output to DOA estimation sections 507 and 508. In the same way as in Embodiment 3, DOA estimation section 507 estimates the direction of arrival of the desired signal of the received signal at time t0, and outputs the estimated direction of arrival to selection section 135. DOA estimation section 508 estimates the direction of arrival of the desired signal of the received signal at time t1, and outputs the estimated direction of arrival to selection section 135.

Selection section 135 selects the direction of arrival of the desired signal with the higher detected received level, and outputs the direction of arrival to radiation pattern forming section 512. Based on the direction of arrival, radiation pattern forming section 512 calculates the weight to form the radiation pattern. Weight 513 is output to radiation pattern forming section 140 of the transmission site.

Timing 601 corresponding to the desired signal selected in selection section 135 is output to transmission timing control section 148. Then, the transmission signal is, in the same way as in Embodiment 2, transmitted according to the radiation pattern, and the transmission timing is controlled based on the selected timing.

Thus, according to the base station apparatus of this embodiment, also in the radio communication system with the spread spectrum communication system, since the direction for transmission is selected with the desired signal power level of the received signal obtained by the adaptive array antenna combining, the weight is calculated based on the selected direction, the radiation pattern for transmission is formed using the weight, the transmission is performed according to the radiation patter, and concurrently the transmission timing is controlled based on the timing of the selected desired signal. Therefore, it is possible to transmit a signal while correcting the timing at which the signal arrives at the communication partner to be constant, and to reduce the difficulties of timing detection at the communication partner, when the time that maximizes the received desired signal power level varies, in addition to the effects obtained in Embodiment 3.

Embodiment 9

Figure 13:
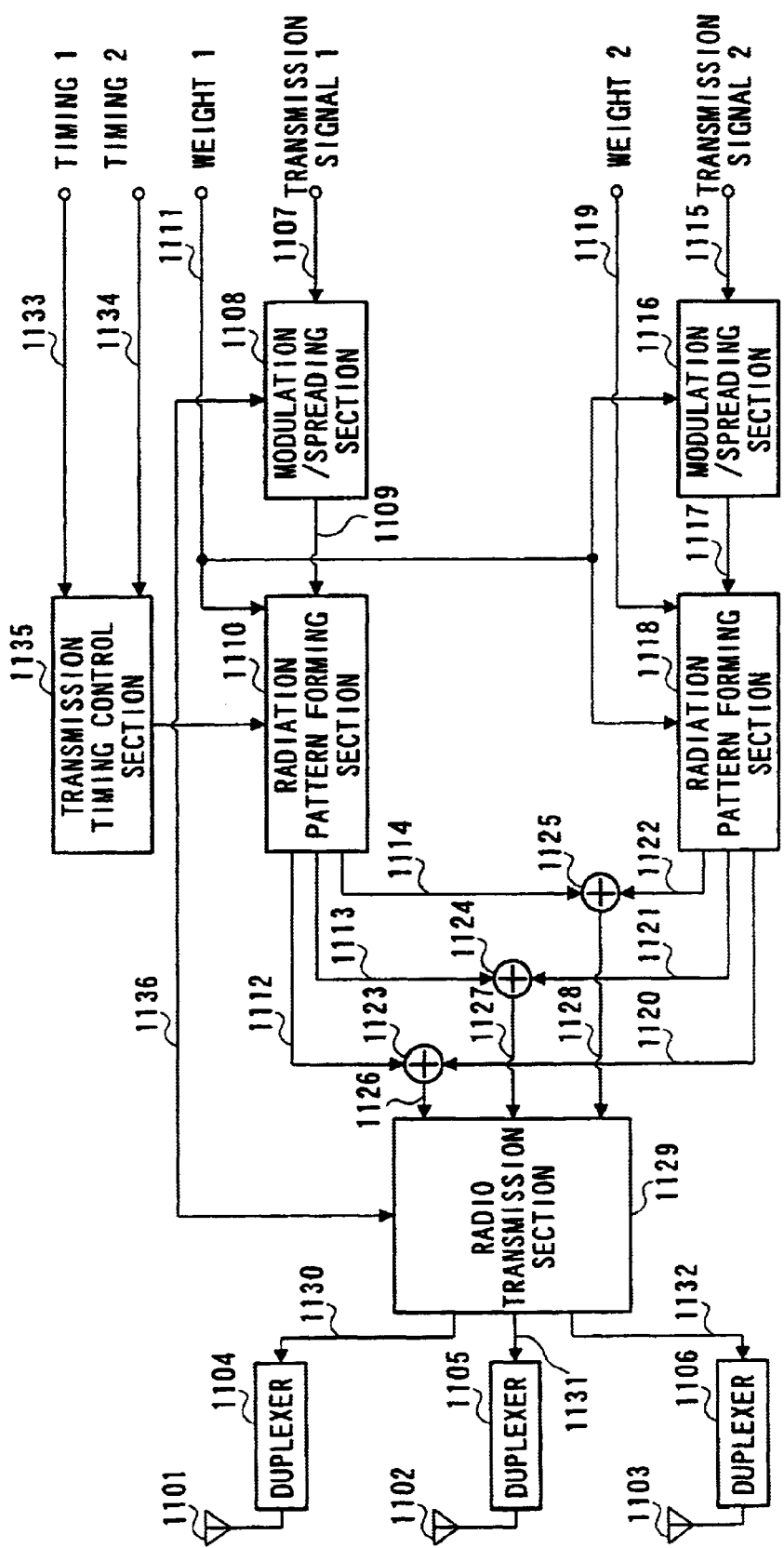
FIG. 13 is a block diagram illustrating a configuration of a base station apparatus according to Embodiment 9 of the present invention.

FIG. 13 is a block diagram illustrating a configuration of a base station apparatus according to Embodiment 9. The base station apparatus illustrated in FIG. 13 is configured corresponding to the case that the number of communication partners is 2. In addition, this embodiment is similarly applicable to the case that the number of communication partners is more than 2. Further, the configuration of the reception site is the same as in the above-mentioned embodiments, and the explanation thereof is omitted.

The operation of the above-mentioned base station apparatus is explained.

The operation for performing adaptive array antenna reception on signals from a plurality of communication partners, and detecting the weight and timing that maximize the desired signal received level is as described in the above-mentioned embodiments.

Transmission signal 1107 for communication partner 1 is data modulated and spread in modulation/spreading section 1108, and output to radiation pattern forming section 1110. Radiation pattern forming section 1110 multiplies the modulated signal by the weight for communication partner 1, and outputs the multiplied signals 1112 to 1114 to adders 1123 to 1125.

Similarly, transmission signal 1115 for communication partner 2 is data modulated and spread in modulation/spreading section 1116, and output to radiation pattern forming section 1118. Radiation pattern forming section 1118 multiplies the modulated signal by the weight for communication partner 2, and outputs the multiplied signals 1112 to 1114 to adders 1123 to 1125.

Radio transmission section 1129 executes the frequency conversion and amplification on signals 1126 to 1128 obtained by adding the signals for communication partners 1 and 2, and resultant signals 1130 to 1132 are transmitted from antennas 1101 to 1103 through antenna duplexers 1104 to 1106, respectively.

In this case, transmission timing 1136 is controlled by transmission timing control section 1135 based on two types of time information 1133 and 1134 each indicative of the time that maximizes the desired signal received level for respective communication partner. At this point, to ensure the orthogonality of the transmission signals, the timing control is performed in such a manner that the unit time for the timing control is within a one-chip duration time. In this radio communication system, when a spreading code capable of keeping the orthogonality in the case where the timing differs by one chip, such as the orthogonal Gold code, is used, it is possible to perform timing correction with the orthogonality kept by performing the timing control within the one-chip duration time. In addition, even when the spreading code is not the orthogonal Gold code, in the case where the cross-correlation becomes small at the time the timing differs by one chip, it is possible to carry out this embodiments into practice.

Thus, according to the base station apparatus of this embodiment, in the radio communication system with the spread spectrum communication system, since the weight and timing for transmission are selected with the desired signal power level of the received signal obtained by the adaptive array antenna combining, the area that the transmitted signal reaches becomes small, and therefore it is possible to improve the spectral efficiency in the downlink.

Further, according to the base station apparatus of this embodiment, by the use of the reversibility of the propagation path, a signal is transmitted in the downlink with a propagation path in which the desired signal power level in the uplink is large, the desired signal power level in the downlink becomes large also. Furthermore, when the time that maximizes the received desired signal power level varies, it is possible to reduce the difficulties of timing detection at the communication partner by transmitting a signal while correcting the timing at which the signal arrives at the communication partner to be constant.

Still furthermore, in the spread spectrum communication system, it is possible to keep the orthogonality of codes of spread spectrum transmission signals by making a residual amount left after the timing adjustment for transmission within a unit chip.

The base station apparatus of any of the above-mentioned Embodiments 1 to 9 is applicable to a communication terminal apparatus such as a mobile station and base station apparatus in a digital radio communication system.

The above-mentioned Embodiments 1 to 9 are capable of being carried into practice in a combination thereof as appropriate. Further, the present invention is not limited to the above-mentioned embodiments, and is capable of being carried into practice with various modifications thereof.

As described above, the base station apparatus of the present invention is capable of recognizing the state of desired signal power at a communication partner, and of facilitating the timing detection at the communication partner. Thereby, it is possible for the base station apparatus to transmit a signal only in the direction of the desired signal arriving, enabling the transmission side to compensate the multipath propagation. Therefore, it is not necessary for a receiver to be provided with highly techniques such as an equalizer. Further, when the time that maximizes the received desired signal power level varies, it is possible to transmit a signal while correcting the timing at which the signal arrives at the communication partner to be constant, and to reduce the difficulties of timing detection at the communication partner.

This application is based on the Japanese Patent Application No. HEI 10-219287 filed on Aug. 3, 1998, entire content of which is expressly incorporated by reference herein.

Industrial Applicability

The present invention is applicable to digital radio communication systems with, for example, portable telephones.

What is claimed is:

1. A base station apparatus comprising:
   a detector that detects a timing for each incoming signal;
   a receiver that performs adaptive array antenna reception at the detected timing for each incoming signal;
   a calculator that calculates a desired signal received level using each received result;
   a selector that selects a weight from respective weights for said each received result based on the calculated desired signal received level and a timing of the received result corresponding to the selected weight from respective timings for said each received result;
   a transmitter that performs transmission with the selected weight; and
   a controller that controls said transmission based on the selected timing.

2. The base station apparatus according to claim 1, wherein said controller controls said transmission to transmit a signal at a timing faster than a standard transmission timing by a difference between a time at which a desired signal is received with a maximum level and another time at which the desired signal is received with a second maximum level.

3. A base station apparatus comprising:
   a detector that detects a timing for each incoming signal;
   a receiver that performs adaptive array antenna reception at the detected timing for each incoming signal;
   a calculator that calculates a desired signal received level using each received result;
   a DOA estimation section that obtains a direction of arrival for said each incoming signal;
   a selector that selects one direction of arrival from the obtained respective directions of arrival based on the calculated desired signal received level and a timing of the received result corresponding to the selected weight from respective timings for said each received result;
   a calculator that calculates a weight for transmission using the selected direction of arrival;
   a transmitter that performs transmission with the calculated weight; and
   a controller that controls said transmission based on the selected timing.

4. The base station apparatus according to claim 3, wherein said controller controls said transmission to transmit a signal at a timing faster than a standard transmission timing by a difference between a time at which a desired signal is received with a maximum level and another time at which the desired signal is received with a second maximum level.

5. A base station apparatus comprising:
   a detector that detects a timing for each incoming signal on a signal despread with a spreading code;
   a receiver that performs adaptive array antenna reception at the detected timing for each incoming signal;
   a calculator that calculates a desired signal received level using each received result;
   a selector that selects a weight from respective weights for said each received result based on the calculated desired signal received level and a timing of the received result corresponding to the selected weight from respective timings for said each received result;
   a transmitter that transmits a signal spread with spreading code using the selected weight; and
   a controller that controls said transmission based on the selected timing.

6. The base station apparatus according to claim 5, wherein said controller controls said transmission to transmit a signal at a timing faster than a standard transmission timing by a difference between a time at which a desired signal is received with a maximum level and another time at which the desired signal is received with a second maximum level.

7. The base station apparatus according to claim 5, wherein said controller controls the timing for transmission within a unit one-chip time.

8. A base station apparatus comprising:
   a detector that detects a timing for each incoming signal on a signal despread with a spreading code;
   a receiver that performs adaptive array antenna reception at the detected timing for each incoming signal;
   a calculator that calculates a desired signal received level using each received result;
   a DOA estimation section that obtains a direction of arrival for said each incoming signal;
   a selector that selects one direction of arrival from the obtained respective directions of arrival based on the calculated desired signal received level and a timing of the received result corresponding to the selected weight from respective timings for said each received result;
   a calculator that calculates a weight for transmission using the selected direction of arrival;
   a transmitter that transmits a signal spread with a spreading code using the selected weight; and
   a controller that controls said transmission based on the selected timing.

9. The base station apparatus according to claim 8, wherein said controller controls said transmission to transmit a signal at a timing faster than a standard transmission timing by a difference between a time at which a desired signal is received with a maximum level and another time at which the desired signal is received with a second maximum level.

10. The base station apparatus according to claim 8, wherein said controller controls the timing for transmission within a unit one-chip time.

11. A radio communication method comprising the steps of:
- detecting a timing for each incoming signal;
- performing adaptive array antenna reception at the detected timing for each incoming signal;
- calculating a desired signal received level using each received result;
- selecting a weight from respective weights for said each received result based on the calculated desired signal received level and a timing of the received result corresponding to the selected weight from respective timings for said each received result;
- performing transmission with the selected weight; and
- controlling said transmission based on the selected timing.

12. A radio communication method comprising the steps of:
- detecting a timing for each incoming signal;
- performing adaptive array antenna reception at the detected timing for each incoming signal;
- calculating a desired signal received level using each received result;
- obtaining a direction of arrival for said each incoming signal;
- selecting one direction of arrival from the obtained respective directions of arrival based on the calculated desired signal received level;
- calculating a weight for transmission using the selected direction of arrival and a timing of the received result corresponding to the selected weight from respective timings for said each received result;
- performing transmission with the calculated weight; and
- controlling said transmission based on the selected timing.

* * * * *